US011127049B2

(12) United States Patent
Carasso

(10) Patent No.: US 11,127,049 B2
(45) Date of Patent: Sep. 21, 2021

(54) PRESENTING ADVERTISEMENT ON INVOCATION OF BROWSER BACK BUTTON

(71) Applicant: ADSUPPLY, INC., Culver City, CA (US)

(72) Inventor: Adam Carasso, Santa Monica, CA (US)

(73) Assignee: AdSupply, Inc., Culver City, CA (US)

(*) Notice: Subject to any disclaimer, the term of this patent is extended or adjusted under 35 U.S.C. 154(b) by 512 days.

(21) Appl. No.: 15/895,159

(22) Filed: Feb. 13, 2018

(65) Prior Publication Data

US 2018/0174201 A1 Jun. 21, 2018

Related U.S. Application Data

(63) Continuation of application No. 13/631,405, filed on Sep. 28, 2012, now Pat. No. 9,892,429.

(60) Provisional application No. 61/670,058, filed on Jul. 10, 2012.

(51) Int. Cl.
*G06Q 30/02* (2012.01)

(52) U.S. Cl.
CPC ..... *G06Q 30/0273* (2013.01); *G06Q 30/0277* (2013.01)

(58) Field of Classification Search
CPC ................. G06Q 30/0273; G06Q 30/0277
See application file for complete search history.

(56) References Cited

U.S. PATENT DOCUMENTS 8,655,819 B1 * 2/2014 Burkard ................. G06N 5/048
706/45
2007/0255810 A1 * 11/2007 Shuster ................. G06F 16/951
709/219

OTHER PUBLICATIONS

Robinson, Pushing and Popping with the History API, Nov. 15, 2011; http://html5doctor.com/history-api/ (Year: 2011).*

* cited by examiner

*Primary Examiner* — David J Stoltenberg
*Assistant Examiner* — Michael J Cross
(74) *Attorney, Agent, or Firm* — Ansari Katiraei LLP; Arman Katiraei; Sadiq Ansari

(57) ABSTRACT

Some embodiments provide code that enables online content providers the ability to better monetize the visits of bounce visitors using display advertisement. The code is embedded in the landing site of a particular content provider. When the landing site is first loaded, the code creates two entries for the landing site in the browser history unbeknownst to the user with the second entry comprising a forwarded fragment of the landing site that allows the code to continue to run. When the user invokes the browser back button, the code detects the invocation. Rather than transition the user from the second entry of the landing site to the first entry, the code retrieves and displays an advertisement. A second invocation of the browser back button then causes the user access a site of a different content provider that was accessed prior to the landing site of the particular content provider.

16 Claims, 7 Drawing Sheets

PRESENTING ADVERTISEMENT ON INVOCATION OF BROWSER BACK BUTTON

CLAIM OF BENEFIT TO RELATED APPLICATIONS

This application is a continuation of U.S. nonprovisional application Ser. No. 13/631,405, entitled "Presenting Advertisement On Invocation of Browser Back Button", filed Sep. 28, 2012, which claims benefit of U.S. provisional application 61/670,058, entitled "Method and Apparatus for Displaying an Advertisement when a User Leaves a Website via the Back Button in a Web Browser", filed Jul. 10, 2012. The contents of application Ser. No. 13/631,405 and 61/670,058 are hereby incorporated by reference.

TECHNICAL FIELD

The present invention is directed to online advertisement systems and, more particularly, to systems and methods for displaying an advertisement to a site visitor who has requested to leave from the landing site of an online content provider via the browser's back button.

BACKGROUND ART

Publishers and distributors of online content, also referred to as online content providers, have two options to produce revenue from their content and support their infrastructure. The first option is the subscription based model. The second option is the advertising based model.

A subscription based model requires a user to pay an online content provider before the user is permitted access to some or all of the content of that online content provider. Payment may be rendered on the basis of a recurring periodic model or based on a pay-per-access model.

An advertising based model relies on display advertising to generate revenue per page of content. In many such models, a first lesser amount of revenue is generated by displaying an advertisement to an end user, otherwise referred to as an advertisement impression, and a second greater amount of revenue is generated when a visitor clicks on a displayed advertisement. In other words, an online content provider generates revenue based on the number of advertisements that are delivered and displayed to visitors of the online content provider sites and based on the number of advertisement click-throughs that result from the advertisements displayed on the online content provider sites.

Online content provider are cognizant that simply increasing the number of advertisements displayed on one site could lead to less visitors and thus less advertisement impressions, because a large number of advertisements displayed on one site could make the user experience less enjoyable (as a result of greater load times) and could make the site appear that it is full of spamming elements. Consequently, online content providers realize that the best method to increase the number of advertisement impressions that their pages receive is by offering more interesting and engaging content. The goal is to maintain visitors on the sites of the online content provider as long as possible with the visitors visiting as many of the internal links or sites that are accessible from the landing site of the online content provider as possible. For example, the home page of cnn.com is rich in breaking news with several internal links. Each internal link accesses a different news article. The home page of cnn.com also contains advertisements in the form of banner ads, sponsored links to other sites, etc. Accordingly, when a visitor lands on the cnn.com home page, the visitor is presented with a first set of advertisements that generate the content provider a first set of monetized impressions and when the visitor clicks on a link for a specific news article, the visitor is taken to an internal site with a second set of advertisements that generate the content provider a second set of monetized impressions.

The online content provider can also increase the number of click-throughs by targeting advertisements to the preferences and interests of their site visitors. Accordingly, online content providers and advertising agencies (that provide the advertisements for display on the sites of the online content providers) analyze the content offered on the sites of the online content providers to balance and maximize the user experience (the smooth consumption of the content) and the types of display units to produce revenue. For example, a video game review site may include advertisements to purchase recently released video games as most visitors to the video game review site are interested in video games.

Nevertheless, offered content is not always of interest to some site visitors. These visitors may come to a site accidentally by clicking on an unintended link. Additionally, these visitors may correctly navigate to the site, but quickly realize that the site does not contain sought after content. In some such instances, these visitors will leave the site by clicking on the browser back button to return to search engine results or a site that was accessed prior to the current site that the visitor wishes to leave. This is referred to as a "bounce" with the visitor referred to as a "bouncing visitor". Visitors that bounce from a site result in little to no monetization to the online content provider because the number of advertisement impressions is limited and because such visitors do not produce any advertisement click-throughs. In fact, to monetize on advertisement impressions, some advertisers require visitors to remain on the site of an online content provider that displays an advertisement for a certain amount of time (e.g., two seconds) before the display of the advertisement is considered an impression that can be monetized. Therefore, when a visitor leaves the site before the specified amount of time, the advertisement display is not considered an impression and the online content provider displaying the advertisement is not provided advertising revenue for that visitor.

The reality of the Internet is that a significant percentage of visitors to any site are bouncing visitors. These visitors result in less impactful advertisement campaigns and the devaluation of the space. As traditional advertising models are unable to effectively monetize on the visits of these bouncing visitors, there is a need for new advertising systems and methods that overcome the deficiencies of traditional advertising models and that nevertheless enable online content providers to monetize on the visits of such bouncing visitors. Specifically, there is a need to monetize the visits from these bouncing visits by identifying them and displaying a large format ad unit as the visitor leaves or bounces from the site. This kind of high impact focus allows for a more complete advertising experience and high monetization levels on previously underserved visitors. This also avoids the growing trend of "ad blindness" where experienced web content consumers (i.e., visitors) block out traditional advertisement units.

SUMMARY OF THE INVENTION

It is an objective of the embodiments described herein to provide systems and methods that enable online content providers the ability to better monetize the visits of bounce visitors using display advertisement. To achieve these and other objectives, some embodiments provide systems and methods that enable an online content provider to detect when a visitor is leaving a landing site of the online content provider and to present an advertisement in between the sequence of the visitor leaving the landing site of the online content provider and the visitor accessing a different site of a different online content provider.

In some embodiments, the systems and methods are implemented in whole or in part by incorporation of code into the landing site of the online content provider. When a user initially loads the landing site with the embedded code in his/her browser, the code executes. Loading of the landing site creates a first entry in the browser history and the code causes a second entry to be created for the landing site.

In some embodiments, the code obtains the URL of the landing site that is associated with the first entry in the browser history, appends a fragment identifier to the URL, and forwards the user to the fragment appended URL to generate the second entry in the browser. The forwarding occurs with insignificant delay such that the forwarding is unnoticed by the user. In some embodiments, the landing site fragment associated with the forwarded URL is itself indistinguishable from the original landing site that is associated with the unmodified URL. Also, the forwarded fragment does not interrupt, halt, or otherwise suspend execution of the embedded code. As such, the code continues to run even when displaying the forwarded fragment.

When the user invokes the browser back button or related back function from the forwarded fragment, the code detects the invocation. The detected invocation is an indication that the user is attempting to bounce from the landing site. Specifically, the user is unaware that two entries have been created in the browser history for the landing site because of the immediacy of the forwarding to the site fragment and because no apparent change was made to the landing site as a result of the forwarding. Accordingly, the user believes that invoking the browser back button will cause the browser to access the site that was accessed prior to the landing site of the online content provider. In actuality, invocation of the browser back button causes the browser to transition from the second entry in the browser history that is associated with the forwarded fragment of the landing site to the first entry in the browser history that is associated with the original landing site. Upon detecting the invocation, the code alters the browser behavior by displaying an advertisement instead of the original landing site. In some embodiments, the code issues a request to an advertising server to retrieve the advertisement and the code creates a new iFrame within the original landing site to display the advertisement over or in place of the underlying content of the original landing site. When the user invokes the back button a second time, the user will then be directed away from the landing site of the online content provider to whichever site was accessed prior to the landing site.

Alternative embodiments realize the same utility, namely monetizing the visit of a bouncing visitor by ensuring presentation of an advertisement upon the visitor navigating away from a specific landing site by invocation of the browser back button. However, the implementation by which the utility is realized differs by leveraging various HTML 5 History API events instead of the aforementioned fragment identifier.

In some such embodiments, when a user initially loads the landing site with the embedded code in his/her browser, the code determines if the current access to the landing site is the first access to the landing site for the current browsing session. If so, the pushState event defined as part of the History API is invoked. The pushState event generates a second entry for the landing site in the browser history in addition to a first entry that is automatically created in the browser history as a result of normal browser operation. This mimics the role of reloading the landing site using the fragment identifier albeit without the need to modify the URL of the landing site.

A popState event is also defined to fire when the browser back button is invoked when the browser is loaded with the entry created by the pushState event. The popState event presents an advertisement in place of either (i) the first entry for the landing site in the browser history or (ii) a site that was accessed just prior to the landing site. A second invocation of the browser back button will then cause the browser to navigate to whatever site was accessed prior to the landing site.

The above identified embodiments present an advertisement when the user invokes the browser back button from the landing site irrespective of whether the invocation of the browser back button occurs on the first visit to the landing site or on subsequent visits to the landing site. In other words, the user can first access the landing site, navigate away from the landing site by selecting an embedded hyperlink, return to the landing site for a second access by invoking the back button, and then invoke the back button again to attempt to bounce from the landing site in which case an advertisement is presented. Some embodiments further modify this behavior such that the advertisement is presented only when the user invokes the back button on the first access to the landing site. To do so, some such embodiments utilize the HTML 5 sessionStorage object or standard browser cookie functionality to count the number of accesses to the landing site. When the browser back button is invoked from the landing site, the code first determines if the current access to the landing site is a first access. If so, the advertisement is presented. Otherwise, the user is directed to the previous entry in the browser history without presentation of the advertisement.

BRIEF DESCRIPTION OF THE DRAWINGS

In order to achieve a better understanding of the nature of the present invention, preferred embodiments for the systems and methods for presenting an advertisement to bouncing visitors will now be described, by way of example only, with reference to the accompanying drawings in which.

DETAILED DESCRIPTION

Figure 1:
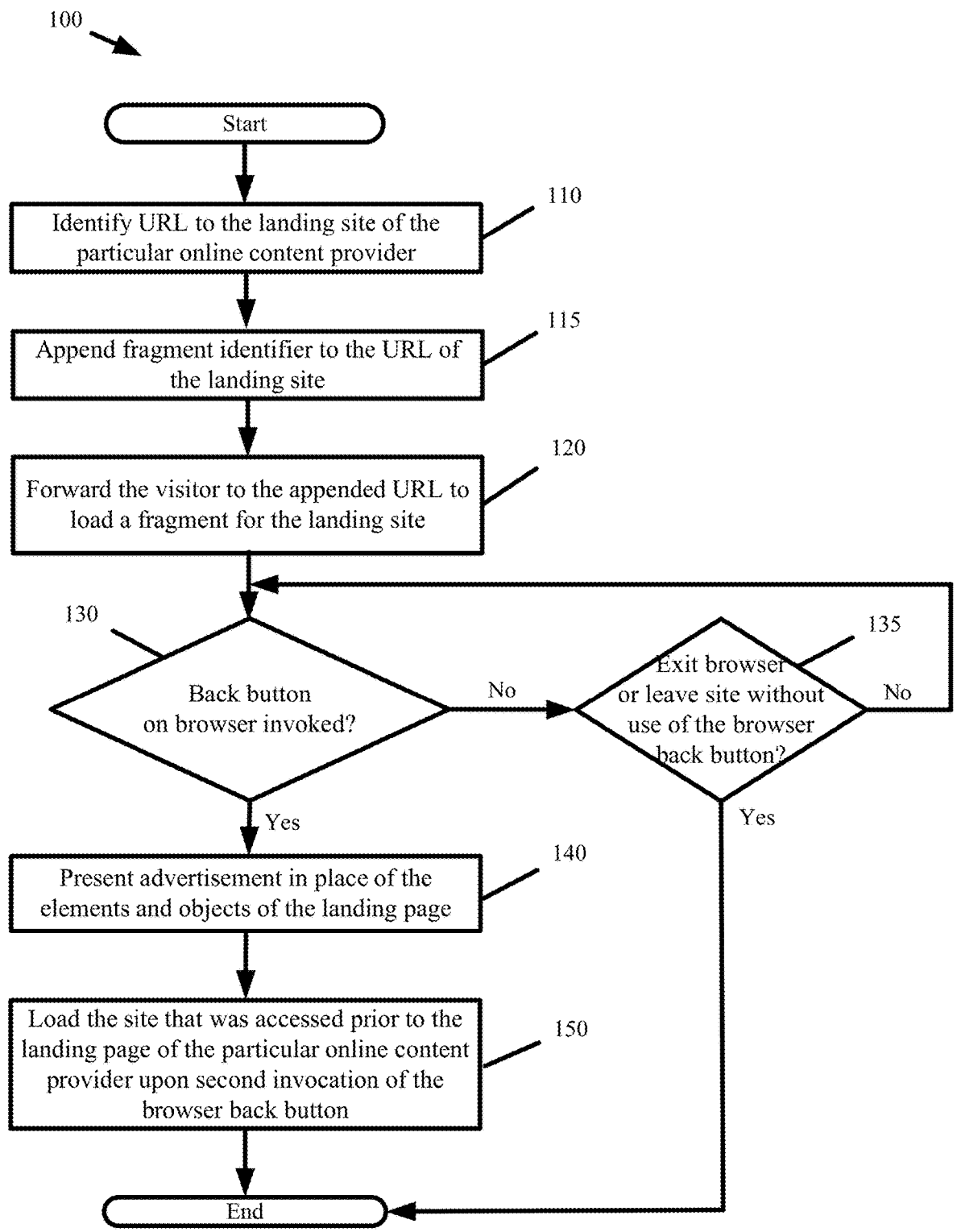
FIG. 1 presents an overview process for presenting an advertisement to a bouncing visitor in accordance with some embodiments.

In the following detailed description, numerous details, examples, and embodiments for systems and methods for presenting an advertisement to bouncing visitors are set forth and described. As one skilled in the art would understand in light of the present description, these systems and methods are not limited to the embodiments set forth, and these systems and methods may be practiced without some of the specific details and examples discussed. Also, reference is made to the accompanying figures, which illustrate specific embodiments in which the systems and methods can be practiced. It is to be understood that other embodiments can be used and structural changes can be made without departing from the scope of the embodiments herein described.

To aid in the discussion that is to follow, a visitor that bounces from a site or a "bouncing visitor" is one who directs his/her browser to a site of an online content provider and some time thereafter leaves the site using the back button on the browser. A bouncing visitor may include one that leaves the site within a specified period of time after having visited the site or may include one that stays on the site for an unspecified period of time before navigating away from the site using the browser back button.

An online content provider is any entity that publishes, hosts, or otherwise disseminates content over digital networks to end users. The end users comprise the visitors and bouncing visitors that consume content of the online content provider. Consumption of the online content provider content occurs by an end user accessing the content via link invocation, Uniform Resource Identifier (URL) specification, direction or redirection, or some other form browser navigation. A browser initiates access to online content provider content by submitting a HyperText Transfer Protocol (HTTP) GET request to a server of the online content provider. The server then returns the content in one or more packets using one or more network protocols such as Internet Protocol (IP) and Transmission Control Protocol (TCP).

A browsing session refers to the browsing that is conducted from the time a browser application is instantiated to the time the browser application is exited. Each site visited during the browsing session is recorded as an entry in the browser history. Therefore, whenever a new site is visited during the browsing session, the site is appended to the browser history. The browsing session may also include revisiting sites that have been previously visited in the same session. This may occur when the user invokes the browser back button, enters the same URL multiple times, or selects a bookmarked link multiple times during the browsing session. Such browsing may cause entries in the browser history be reordered, replaced, or removed. The browser history is effectively maintained as a first-in first-out queue. It should be known to one of ordinary skill in the art that browsers log a browsing session by tracking the sites that are visited during the browsing session to a browser history. Browsers also allow users to traverse the browsing history by accessing previously visited sites in the order they were accessed using the browser back button or related back function.

A landing site refers to the initial site of a particular online content provider that is accessed by a site visitor. The landing site can be any site accessible from the domain of the particular online content provider and therefore can include a homepage or any other sites of the particular online content provider that is accessed first during a given browsing session. For example, the landing site may be represented by the homepage "www.example.com" or may alternatively be represented by the site "www.exmaple.com/site1" when either site is first accessed during a given browsing session. From the landing site, other sites of the particular online provider may be accessed using internal links and other navigation functions.

Throughout this discussion, reference is made to invocation of the browser back button. This reference is not restrictive to clicking on the user interface element corresponding to the back button in the graphical user interface of the browser. Instead, this reference generally applies to any means with which back button functionality of a browser can be invoked. Accordingly, reference to invoking the browser back button includes performing keyboard shortcuts, touch gestures, and other commands that invoke back button functionality of the browser.

I. Overview

To provide online content providers the ability to monetize on the visits of bouncing visitors using advertisements, some embodiments alter the expected browser behavior when a site visitor attempts to leave the landing site of a particular online content provider by invoking the browser back button. Ordinarily, invoking the browser back button from the landing site of the particular online content provider will cause the browser to present a site of another online content provider that was accessed prior to the landing site of the particular online content provider. Some embodiments however cause the browser to display an advertisement instead. Specifically, the advertisement is displayed instead of the site of another online content provider when the back button of the browser is invoked from the landing site of the particular online content provider. A second invocation of the browser back button then navigates away from the advertisement to display the site of the other online content provider that was accessed prior to the landing site of the particular online content provider.

By displaying the advertisement in this manner, the particular online content provider is guaranteed at least one advertisement impression for any visitor to a landing site of the particular online content provider, including an advertisement impression for a visitor that bounces from the landing site of the particular online content provider. Advertisers monetarily compensate the particular online content provider for each such advertisement impression, thereby allowing the particular online content provider to profit from any visit to its sites, whereas other content providers not employing these systems and methods would realize no compensation from a bouncing visitor.

Specialized code embedded within a landing site of a particular online content induces the altered browser behavior whereby an advertisement is presented when a visitor navigates away from the landing site using the browser back button. Appendix A at the end of this disclosure presents one embodiment for the code that provides the altered browser behavior. However, it should be apparent that the altered browser behavior can also be achieved based on different variations of the code. Accordingly, the description below describes the general functionality without specific reference to the code listing in Appendix A.

The specialized code is embodied as a set of instructions executable by a processor. The embedded code is stored to a non-transitory computer-readable storage medium. The code can be defined as a set of JavaScript instructions, PHP instructions, another scripting or coding language, or some combination thereof and can be embedded with any standards compliant site definition including those defined using HyperText Markup Language (HTML), JavaScript, Cascade Style Sheets (CSS), or some combination thereof as some examples. Accordingly, the systems and methods for presenting an advertisement on invocation of the browser back button are applicable to any standards compliant web browsing application such as Microsoft's Internet Explorer, Google's Chrome, and Apple's Safari as some examples, irrespective of whether the application is run on a desktop, laptop, tablet, smartphone, or other computing device having a microprocessor and non-transitory computer-readable storage medium as further enumerated in FIG. 7 below.

The embodiments presented herein provide for client-side execution of the embedded code. In some embodiments, the embedded code may be executed on the server-side when sites that are embedded with the code are primarily executed by a server rather than a client. In either case, the machine executing the code is transformed from a general purpose computing device to a specialized machine that displays advertisements upon a visitor leaving a landing site that is embedded with the specialized code. In other words, the code modifies standard browser operation to provide the herein described altered browser operation as well as modifying operation of any general purpose computing device so that an online content provider can monetize a visit from a visitor that bounces from a site of the online content provider, thereby producing a real and tangible result in the form of the monetary compensation that the online content provider receives from the advertiser.

FIG. 1 presents an overview process 100 for presenting an advertisement to a bouncing visitor in accordance with some embodiments. The process 100 describes how the specialized code embedded in a landing site results in the altered browser behavior. Accordingly, the process 100 commences when a visitor directs his/her browser to a landing site of a particular online content provider that is embedded with the specialized code. Any site of the particular online content provider can become the landing site when the URL specified in the visitor's browser identifies a first access by the visitor to a domain and, by extension, to a site of the particular online content provider. When the landing site is loaded in the browser of the visitor, the specialized embedded code is executed and the process 100 commences.

The process identifies (at 110) the URL of the landing site. Next, the process appends (at 115) a fragment identifier to the URL. For example, the URL of the landing site may be specified as "www.example.com" and the modified URL may be specified as "www.example.com #!" with the hash tag introducing the fragment identifier. The fragment identifier and its uses as described in the embodiments presented herein are compliant with Request For Comment (RFC) 3986 and HTML version 4. Accordingly, usage of the fragment identifier and the functionality derived for the disclosed embodiments are compliant with standard web browser operation.

The process forwards (at 120) the visitor browser to the modified URL that is appended with the fragment identifier. In so doing, the browser loads a fragment modified landing site, wherein the fragment identifier identifies different subresources that replace primary resources in the original landing site. In some embodiments, the fragment identifier is an empty fragment identifier that does not introduce any subresources such that no landing site objects or elements are added or replaced. In some such embodiments, the fragment modified landing site does not change the presentation of the original landing site. The forwarding may occur as the landing site is loading, immediately after loading the landing site, or shortly after loading the landing site (e.g., 100 ms). The immediate forwarding to the fragment occurs unbeknownst to the site visitor. Specifically, the forwarding occurs fast enough and does not cause any change to the landing site such that the visitor remains wholly unaware of the forwarding. It is worth noting that the immediacy of the forwarding introduces insignificant and unnoticeable delay to the visitor's browsing experience (e.g., 100 milliseconds).

Forwarding the visitor to the modified URL serves two underlying purposes in altering the browser operation. The first purpose is to create two entries in the visitor's browser history. As per standard browser operation, the browser running on the visitor machine records the loading of the landing site associated with the URL identified at 110 as a first entry in the browser history and the mirrored landing site identified by the modified URL appended with the fragment identifier as a second entry in the browser history. For the purposes of this discussion, reference to a first entry and a second entry is not intended to convey exact positions in the browser history, but rather relative positions with respect to other entries that exist prior to the logging of the first entry and the second entry.

The second purpose for forwarding the visitor to a fragment of the landing site is to allow the embedded code that was obtained when loading the landing site corresponding to the URL identified at 110 to continue to run even when displaying the landing site fragment corresponding to the URL modified with the fragment identifier. This is because the fragment merely serves to augment or modify portions of the landing site. In this case, no modification is made to any portion corresponding to the specialized embedded code, thereby allowing the specialized embedded code to continue to run with the nonexistent subresources of the landing site fragment.

While the visitor browser displays the fragment modified landing site (i.e., the landing site corresponding to the fragment appended URL), the process determines (at 130) whether the back button on the browser is invoked. It should be noted that the process may be temporarily halted, suspended, or run in the background when the visitor invokes internal links of the landing site or otherwise navigates away from the landing site without use of the browser back button. However, when the visitor returns from those sites to the fragment modified landing site corresponding to the modified URL (e.g., via back button invocation from the internal links), the process will resume at 130.

When the back button is invoked while the fragment modified landing site is displayed in the visitor browser, the process presents (at 140) an advertisement instead of reloading the landing site corresponding to the original landing site URL. This altered browser behavior is enabled as a result of creating the two entries in the browser history and the misdirection in which the site visitor is unaware that the two entries have been created. Specifically, when the visitor is on the fragment modified landing site but thinks he/she is on the original landing site, the visitor expects that invocation of the browser back button will cause the browser to access a different site of a different online content provider that was access prior to the landing site of the particular online content provider. In actuality, invocation of the browser back button causes the browser to transition from the second entry in the browser history for the fragment modified landing site corresponding to the fragment appended URL to the first entry of the landing site corresponding to the unmodified URL. The specialized embedded code continues to run during this sequence as the forwarded fragment does not include a subresource that replaces the specialized embedded code. The code identifies invocation of the browser back button from the fragment modified landing site and at this stage, the code may retrieve an advertisement from an advertising server. Next, the code causes the advertisement to be displayed in place of the original landing site when transitioning from the second entry to the first entry for the landing site in the browser history. In some embodiments, the advertisement is displayed as a new iFrame within the landing site. A second invocation of the browser back button will produce the user intended result and the process loads (at 150) the site that was accessed prior to the landing site of the particular online content provider.

When the back button is not invoked at 130 while displaying the fragment modified landing site, the process continues (at 135) to perform the determination at 130 until the visitor exits the browser or leaves the sites of the particular online content provider using other means than the browser back button (e.g., typing a new URL, invoking a link to another online content provider, etc.).

Process 100 enables content providers the ability to display an advertisement to bouncing visitors, thereby better monetizing the traffic that those content providers receive from bouncing visitors. The process is applicable to all users as it is based on standard browser functionality, notably the fragment. Moreover, traditional advertisement blocking tools will be unable to block the advertisement as the tools are tricked into believing that the advertisement being presented is the landing site.

Figure 2:
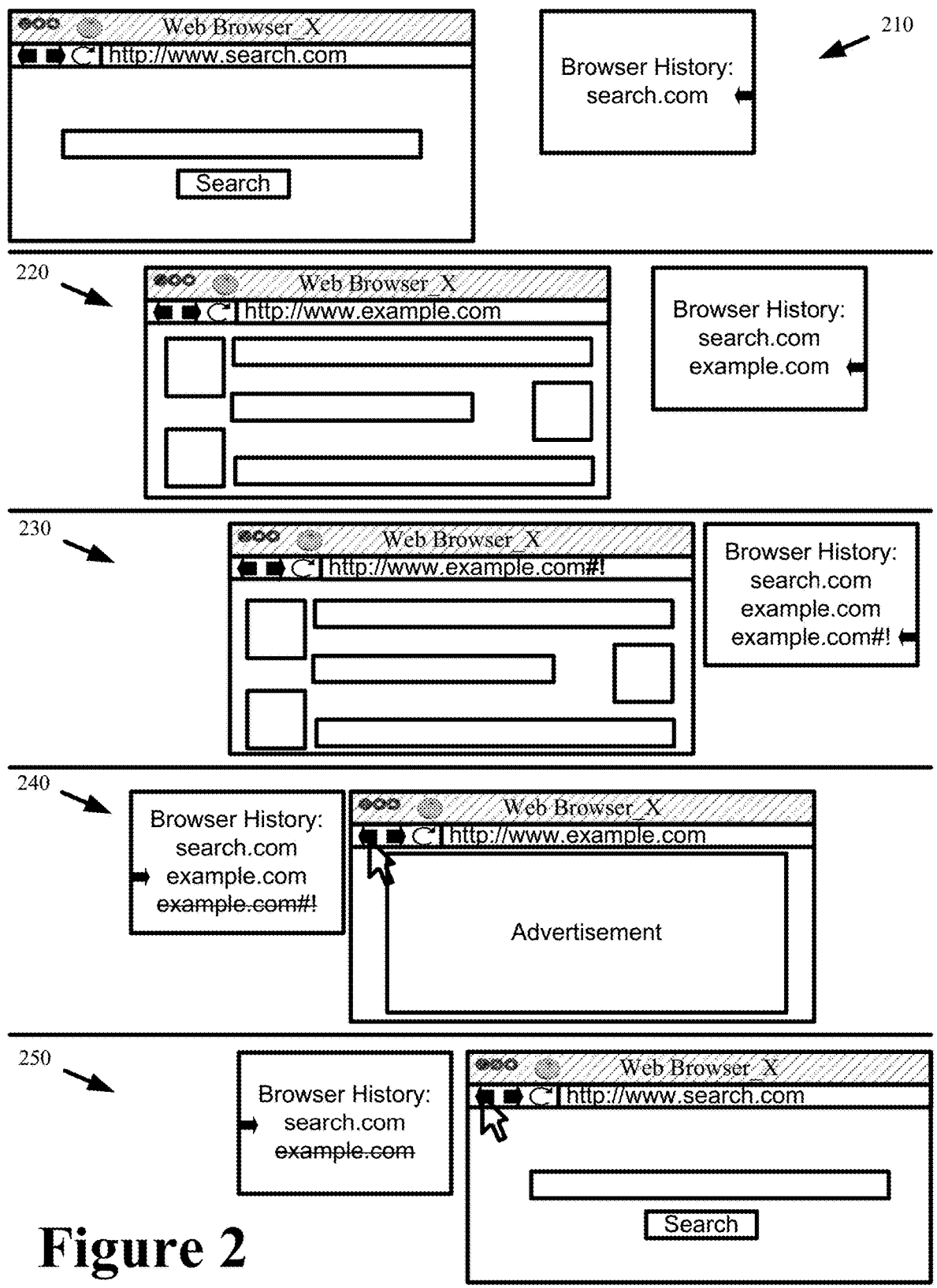
FIG. 2 illustrates the process of FIG. 1 for displaying an advertisement to visitors that bounce from the landing site of an online content provider by invoking the browser back button in accordance with some embodiments.

FIG. 2 illustrates the process 100 for displaying an advertisement to visitors that bounce from the landing site of an online content provider by invoking the browser back button in accordance with some embodiments. The figure illustrates a sequence of user browser windows, the browser history at each step in the sequence, and various interactions by the user that cause the advertisement to display when the user attempts to bounce from the landing site by invoking the browser back button.

At 210, the user navigates his browser to a site of an online content provider that is not embedded with the specialized code provided herein. The site is identified by the URL "www.search.com" and the URL is entered in the browser history.

At 220, the user navigates away from the "www.search.com" site to a different landing site "www.example.com" of a particular online content provider that is embedded with the specialized code. The URL "www.example.com" is entered to the browser history. Though not shown, the user may have navigated to zero or more other sites located at different domains than that of the particular online content provider before navigating to the landing site at 220. In other words, it is assumed for the purposes of this figure, that the access to the landing site at 220 is the first access to that site during the current browsing session. It is irrelevant how the user navigates to the landing site, though the navigation can be the result of the user entering the URL of the landing site in the browser, clicking on a link embedded in the "www.search.com" site, or invoking a bookmarked link as some examples.

The specialized code embedded within the landing site at 220 forwards the browser to the fragment appended URL "www.example.com #!" at 230 which causes a new entry for "www.example.com #!" to be entered in the browser history after the entry for "www.example.com". The fragment associated with the forwarded landing site is empty such that the content of the original landing site is unchanged. In other words, no subresources are introduced or used to replace primary resources of the landing site associated with the "www.example.com" URL. Due to the immediacy with which the forwarding occurs and the lack of any noticeable change to the original landing site, end user will be unaware that the forwarding occurred but for the fragment identifier that is appended to the landing site URL in the browser.

At 240, the end user invokes the browser back button. In so doing, the browser attempts to load the site associated with the last entry in the browser history. The user believes that he/she is one site removed from "www.search.com" and expects to return to that site as a result of invoking the back button. In actuality, the invocation of the browser back button will cause the browser to transition from the fragment identifier modified URL for the landing site of 230 to the unmodified URL for the landing site at 220. The embedded code continues to run during this sequence because execution of the code was never interrupted when loading the non-existent or empty subresources associated with the fragment appended URL. Since the code continues to run during this sequence, it detects the browser back button invocation and causes an advertisement to be displayed instead of the contents of the landing site at 250.

II. Implementation

A. Fragment Identifier

Figure 3:
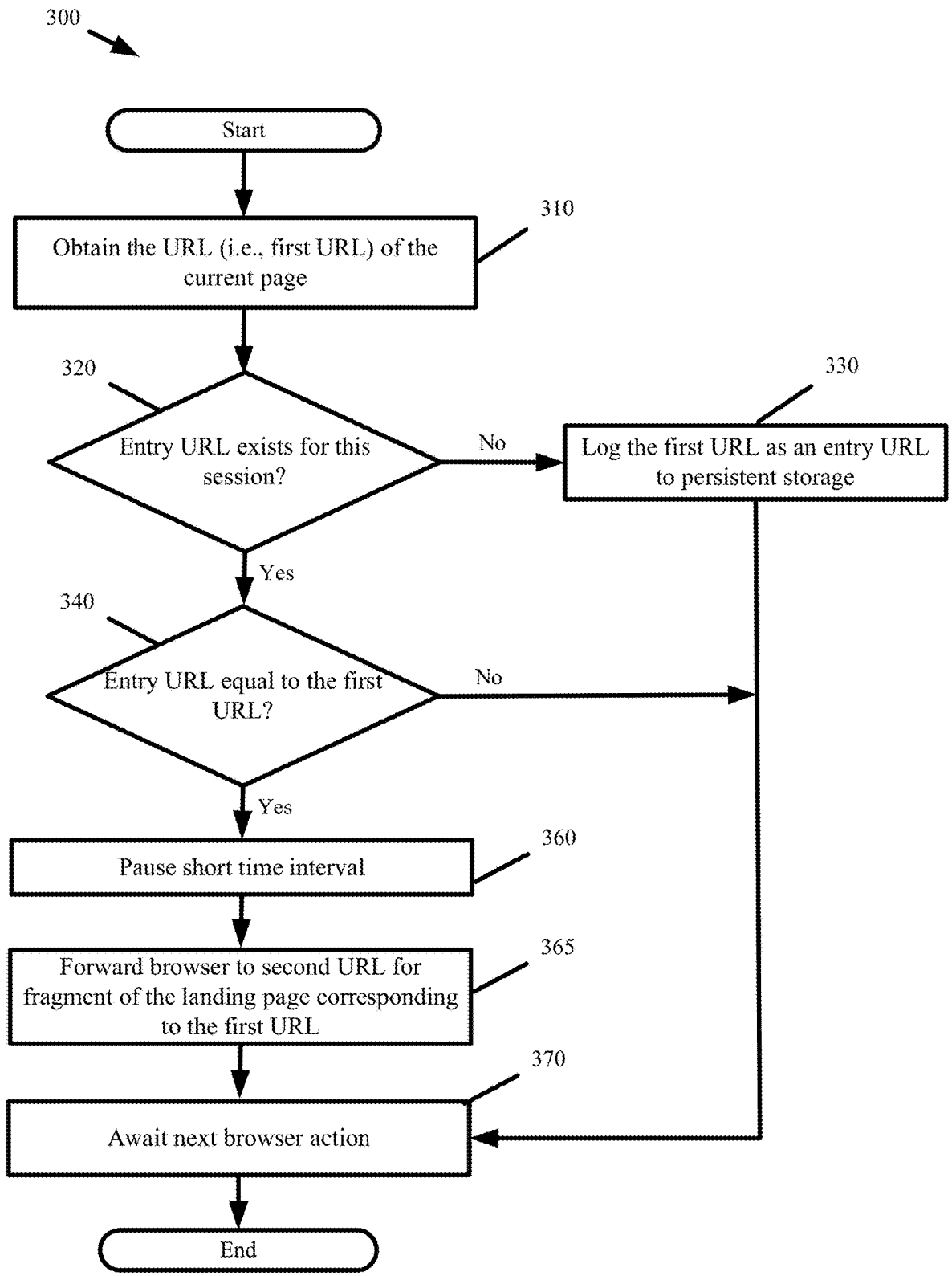
FIG. 3 presents a process for determining whether a landing site has been reached in accordance with some embodiments.
Figure 4:
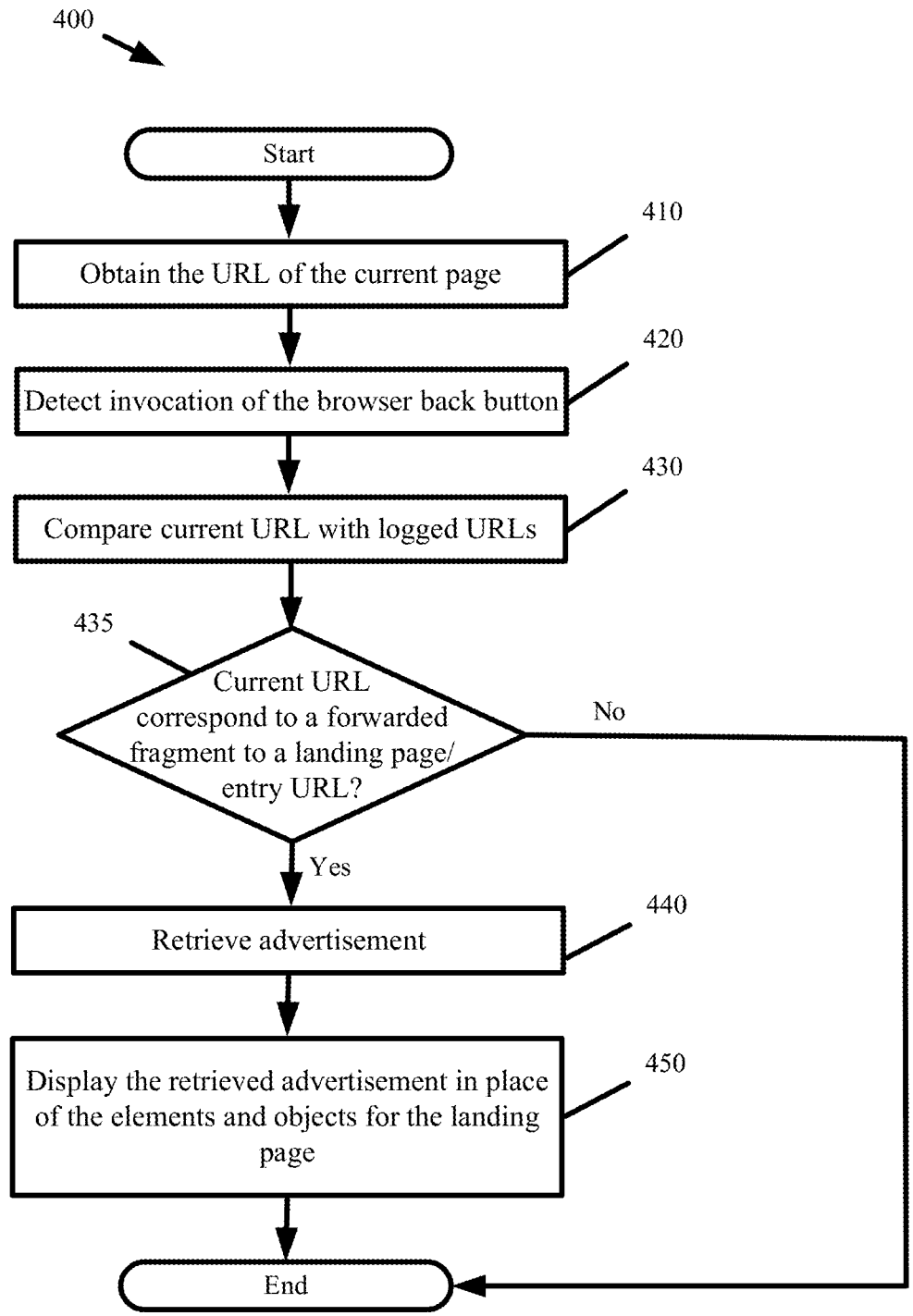
FIG. 4 presents a process for determining when a visitor attempts to leave a landing site of an online content provider by invoking the browser back button.

FIGS. 3 and 4 detail the processes by which the code embedded within a landing site can be used to present an advertisement to a bouncing visitor in accordance with some embodiments. Specifically, FIG. 3 presents a process 300 for determining whether a landing site has been reached in accordance with some embodiments. The access may be a first access to the landing site. The access may alternatively be a secondary or later access to the landing site, whereby a visitor returns to the landing site after navigating to other sites of the same or different content provider during the same browsing session. This process allows the above described functionality to occur even when the visitor navigates away from a landing site by means other than invoking the browser back button and then subsequently returns to the landing site.

The process obtains (at 310) the URL of the current page. For the purposes of this figure, the obtained URL is referred to as the first URL. Next, the process determines (at 320) whether an entry URL exists for this session. The entry URL is the URL representing the landing site of a particular content provider or the first site accessed for a given online content provider domain. An entry URL will only exist for those sites that are embedded with the code set forth by the embodiments herein. The determination is made to present an advertisement only when the visitor leaves from the landing site with the embedded code using the browser back button and to avoid presenting the advertisement when the visitor leaves from another site that was accessed subsequent to the landing site by means other than the browser back function. The determination is also made so that there is only a single landing site for each content provider and that the landing site does not change once established during a given browsing session.

To perform the determination at 320, the process compares the first URL with a set of logged URLs to see if at least one logged URL has a domain name, hostname, or other segment that matches that of the first URL. In other words, if the first URL matches with a logged URL, then the process determines that an entry URL exists for the first URL.

When the domain name, hostname, or other segment of the first URL does not match with any logged URLs, the process identifies the current access to the site as the first access for the current browsing session. Accordingly, the first URL is logged (at 330) as an entry URL, whereby the first URL is stored to persistent storage on the end user machine for the duration of the browsing session. By storing to persistent storage, multiple entry URLs can be tracked during a particular browser session. Moreover, the user can navigate away from an entry URL such that the embedded code is halted, suspended, or otherwise interrupted and once the user navigates back to the entry URL, the code can resume and determine whether to display an advertisement. The process awaits (at 370) the next browser action and ends.

When the domain name, hostname, or other segment of the first URL matches with that of a logged URL, the process next determines (at 340) whether the first URL is the entry URL. This determination is based on whether the first URL exactly matches the identified logged URL.

When the first URL does not match the logged entry URL, the process awaits (at 370) the next browser navigation action (e.g., invoking a hyperlink, specifying a new URL, invoking the browser back button, etc.).

When the first URL matches the logged entry URL, the process pauses (at 360) a short time interval (i.e., 100 milliseconds) and then forwards (at 365) the browser to second URL identifying a fragment of the landing site. In some embodiments, the second URL is the first URL appended with a fragment identifier. In some embodiments, the fragment identifier is identified by the hashtag or number sign character followed by one or more characters. For example, the landing site for CNN may be "www.cnn.com" and the fragment may be identified as "www.cnn.com #!". It should be apparent that other identifiers may be used. Forwarding the browser to the fragment causes it to reload the landing site as defined by the fragment with the fragment typically being an empty fragment such that no additional elements or objects or added, removed, or modified from the landing site corresponding to the first URL. The process awaits (at 370) the next browser navigation action and ends.

FIG. 4 presents a process 400 for determining when a visitor attempts to leave a landing site of an online content provider by invoking the browser back button. The process is performed when the visitor browser is loaded with the fragment of the landing site for a site containing the embedded code and the embedded code is executed by the browser. The process may be suspended or exited when the visitor navigates away from the landing site fragment and resumed or reinstantiated when the visitor subsequently navigates back to the landing site fragment during the same browsing session.

The process commences by obtaining (at 410) the URL for the page currently loaded in the browser. The process detects (at 420) invocation of the browser back button. The process then compares (at 430) the obtained URL to the logged URLs (that were stored to persistent storage) to determine (at 435) if the obtained URL corresponds to a forwarded fragment to a landing site represented by a logged URL (i.e., an entry URL). In some embodiments, this comparison is simplified by extracting a fragment identifier from the obtained URL and then determining if the remainder of the obtained URL matches to a logged URL for a specified entry URL.

When the obtained URL does not correspond to a forwarded fragment for a landing site, the process ends. Otherwise, when the obtained URL corresponds to a forwarded fragment for a landing site, the process retrieves (at 440) an advertisement from an advertising server. In some embodiments, the advertisement is retrieved when the landing site is initially loaded such that the advertisement is cached and ready to be displayed should the visitor bounce from the landing site. Also, when retrieving the advertisement from the advertising server, the specialized embedded code may pass one or more parameters to the advertising server. These parameters assist the advertising server in identifying an advertisement that is custom tailored to the preferences of the visitor. As one example, the code may pass the URL of the landing site to the advertising server which identifies the landing site as a video game website and the advertising server returns an advertisement for a video game that is relevant to that URL.

The process embeds (at 450) the advertisement within an iFrame of the landing site to cause the advertisement to display in place of the elements and objects for the landing site, and the process ends. A second invocation of the back browser button will cause the browser to display a site that was accessed just prior to the landing site. In some embodiments, the iFrame containing the advertisement is sized so as to obscure the underlying elements and objects of the landing site and so as to present the advertisement as a full window or full size advertisement. In some other embodiments, the specialized code rewrites the instructions for how the landing site is rendered so as to remove the underlying elements and objects for the landing site and to present the advertisement instead. It should be apparent that other techniques besides those enumerated herein may be used to display the advertisement in place of the landing site. For example, the advertisement may be displayed in a new pop-up window.

B. History API

Alternative embodiments leverage the session history functions of the HTML 5 History API to realize the same utility as the above described embodiments leveraging the fragment identifier, namely monetizing the visit of a bouncing visitor by ensuring presentation of an advertisement upon the visitor navigating away from a specific landing site by invocation of the browser back button. The HTML 5 History API provides various events to manipulate the browser session history. Of particular note are the pushState and popState events. The pushState event allows an entry to be added to the browser session history and the popState event defines a custom function that fires when the browser back button is invoked to navigate away from the entry associated with the pushState event. Specifically, the popState event is defined to present an advertisement. The parameters and usage of these events are defined as part of the HTML 5 specification and are omitted for purposes of simplicity.

Figure 5:
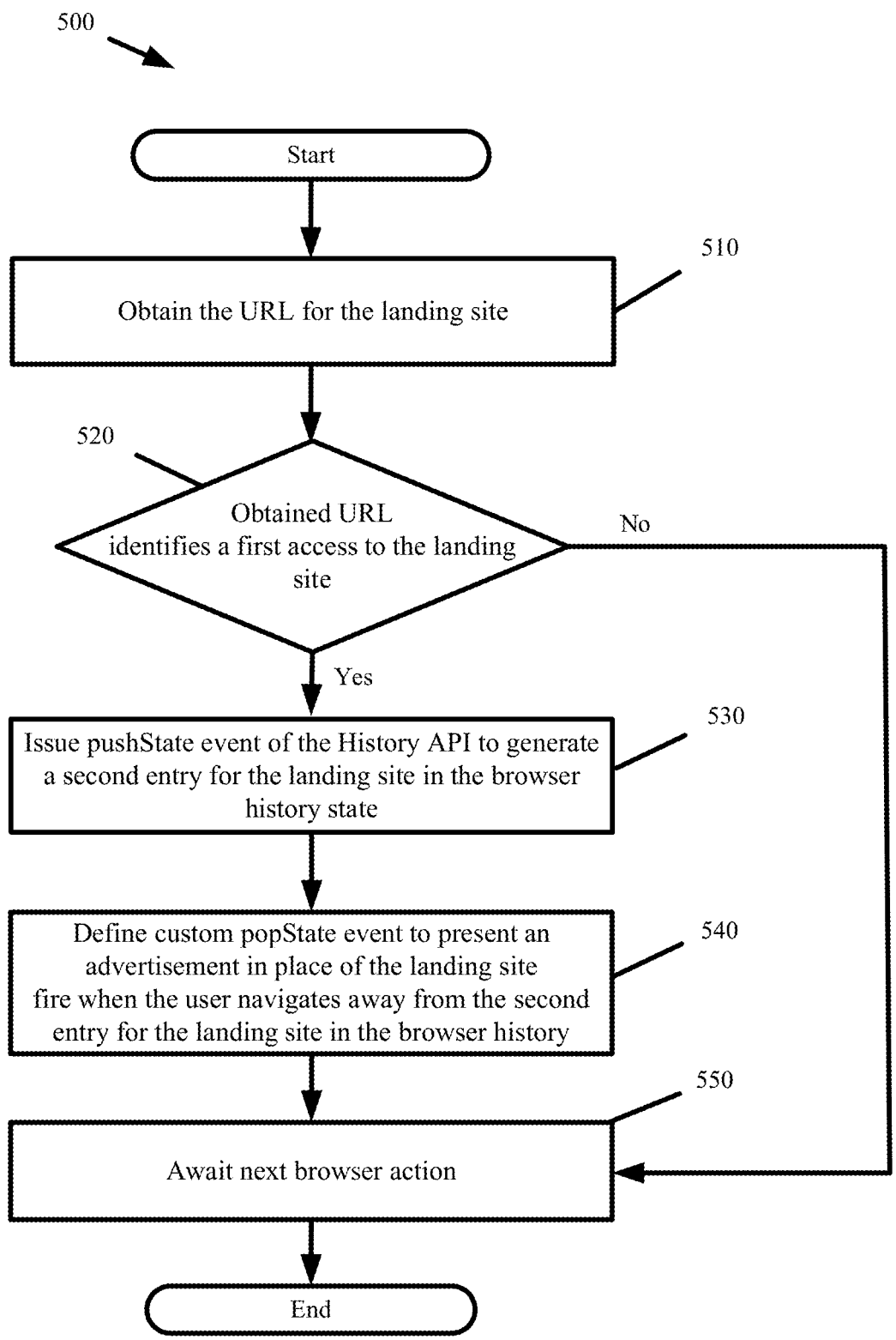
FIG. 5 presents a process for utilizing the History API functionality to create a second entry in the browser history of the user's browser in accordance with some embodiments.

FIG. 5 presents a process 500 for utilizing the History API functionality to create a second entry in the browser history of the user's browser in accordance with some embodiments.

Process 500 is defined by the code that is embedded in a landing site of a particular content provider and the process 500 is run by a user browser when that landing site is accessed by the user browser.

The process 500 commences by obtaining (at 510) the URL of the current page. The process determines (at 520) whether the obtained URL identifies a first access to the landing site. As with process 300, the process can determine a first access by checking persistent storage of the user machine to identify whether the current URL has been logged at any prior point in the current browsing session. If the current URL is not logged to persistent storage, the current access is a first access to the landing site in the current browsing session. If the current URL is logged to persistent storage, the current access is a subsequent access in the current browsing session. At the end of the browsing session (i.e., when the browser is closed or exited), the logged entries are removed from the persistent storage. As discussed below, the sessionStorage object and browser cookie can also be used in determining whether a current access to a landing site a first such access to the landing site during the current browser session.

When the current access is a first access, the process issues (at 530) the pushState event of the History API to generate a second entry for the landing site in the browser history that is in addition to a first entry that is automatically created in the browser history for the landing site as a result of standard browser operation. The result therefore mimics the creation of two entries using the above described fragment identifiers. However, using the pushState event has the added benefit of wholly obscuring the result from the user. Specifically, the URL of the user browser does not change, unlike the process 300 above which appends a fragment identifier to the landing site URL.

Next, the process defines (at 540) a custom popState event to fire when the user navigates away from the browser history entry that was created as a result of the pushState event, wherein the user navigates away by invoking the browser back button. The process then awaits (at 550) the next user action and the process ends. When the current access is not a first access, the process awaits (at 550) the next user action and the process ends.

When fired, the custom popState event presents an advertisement in place of the landing site. In some embodiments, the popState event is defined to retrieve an advertisement from an advertising server and to present the advertisement in place of the elements and objects of the landing site that would ordinarily be presented when accessing the first entry for the landing site in the browser history. The popState may be defined to pass one or more parameters when retrieving the advertisement from the advertising server. These parameters assist the advertising server in identifying an advertisement that is custom tailored to the preferences of the visitor. The popState may cause the advertisement to be displayed in an iFrame, in a popup window, or through other display means. A second invocation of the back browser button will cause the browser to display a site that was accessed just prior to the landing site.

Each of implementations described thus far can be modified to better differentiate true bouncing visitors that visit a landing site and immediately bounce thereafter from other visitors that visit a landing site, navigate to one or more other sites, return to the landing site, and then bounce from the landing site. To differentiate between such visitors, the above described implementations are modified to track the number of accesses a particular user makes to a particular landing site in a given browsing session. Some embodiments utilize the HTML 5 sessionStorage object or standard browser cookie functionality to track these accesses. The sessionStorage object is defined per the HTML 5 specification and is an object that can be used to store data for a current browsing session.

The access counts can be used by process 400 or a custom popState event to present an advertisement to a visitor that bounce from a landing site on the first access to that landing site and to enable expected browser back button functionality when the visitor bounces from the landing site on a subsequent access to that landing site. The access counts are retained in either the sessionStorage object or the browser cookie for the duration of a browsing session. When the browsing session ends, the access counts are reset or deleted.

Figure 6:
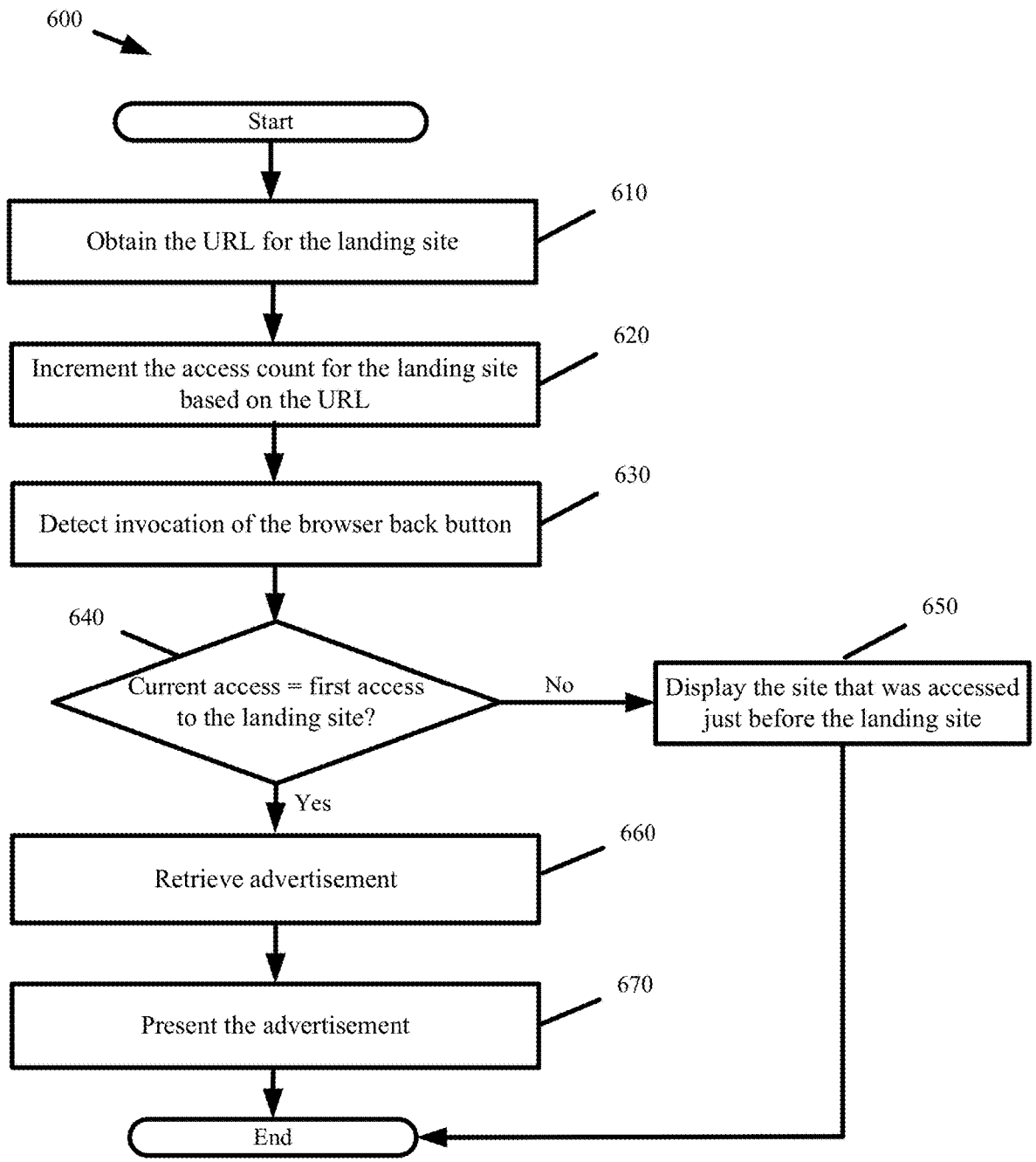
FIG. 6 presents a process in accordance with some embodiments for presenting an advertisement to a visitor that bounces from a landing site only on the first access to that landing site by the visitor in a current browsing session.

FIG. 6 presents a process 600 in accordance with some embodiments for presenting an advertisement to a visitor that bounces from a landing site only on the first access to that landing site by the visitor in a current browsing session. The process commences by obtaining (at 610) the URL for the landing site (i.e., the current page). When using the sessionStorage object to store the access counts, the URL is used as input to identify the access count for the landing site. When using the browser cookie to store the access counts, the URL is used as a text string identifier to identify the access count for the landing page. The process increments (at 620) the access count for the landing site based on the URL. The process then detects (at 630) invocation of the browser back button. Upon detecting invocation of the browser back button, the process determines (at 640) whether the current access to the landing site is a first access based on the access count.

Should the current access not be a first access, the process displays (at 650) the site that was accessed just before the landing site as per expected browser behavior. Otherwise, the current access is a first access. Accordingly, the process retrieves (at 660) an advertisement and presents (at 670) the advertisement in place of the elements and objects for the landing page and in place of the site that was accessed prior to the landing site. A second invocation of the browser back button will then cause the browser to display the site that was accessed just before the landing site. As should be evident, process 600 can be adapted to operate with either the fragment identifier implementation or the History API implementation described above for presenting advertisements to bouncing visitors.

III. Computer System

Many of the above-described processes and components are implemented as software processes that are specified as a set of instructions recorded on non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense and may include any electronic device with a processor that executes instructions stored on computer-readable media or that are obtained remotely over a network connection. Examples of computer-readable media include, but are not limited to, CD-ROMs, flash drives, RAM chips, hard drives, EPROMs, etc. Further, wherever a server is identified as a component of the embodied invention, it is understood that the server may be a single physical machine, or a cluster of multiple physical machines performing related functions, or virtualized servers co-resident on a single physical machine, or various combinations of the above.

Figure 7:
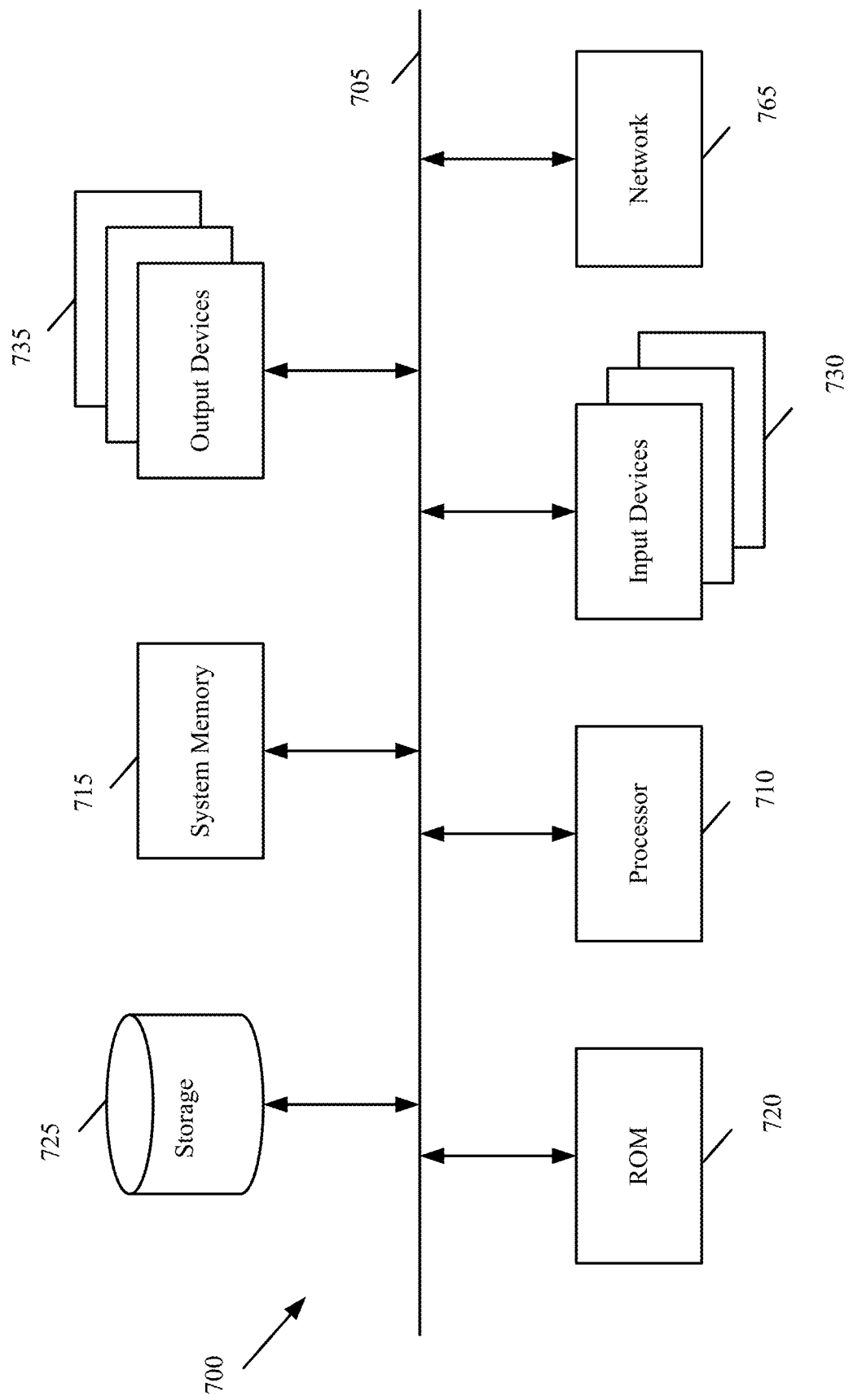
FIG. 7 illustrates a computer system or server with which some embodiments are implemented.

FIG. 7 illustrates a computer system or server with which some embodiments are implemented. Such a computer system includes various types of computer-readable mediums and interfaces for various other types of computer-readable mediums that implement the processes described herein. Computer system 700 includes a bus 705, a processor 710, a system memory 715, a read-only memory 720, a permanent storage device 725, input devices 730, and output devices 735.

The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725. From these various memory units, the processor 710 retrieves instructions to execute and data to process in order to execute the processes of the invention. The processor 710 is a processing device such as a central processing unit, integrated circuit, graphical processing unit, etc.

The read-only-memory (ROM) 720 stores static data and instructions that are needed by the processor 710 and other modules of the computer system. The permanent storage device 725, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 725.

Other embodiments use a removable storage device (such as a flash drive) as the permanent storage device Like the permanent storage device 725, the system memory 715 is a read-and-write memory device. However, unlike the storage device 725, the system memory is a volatile read-and-write memory, such as random access memory (RAM). The system memory stores some of the instructions and data that the processor needs at runtime. In some embodiments, the processes are stored in the system memory 715, the permanent storage device 725, and/or the read-only memory 720.

The bus 705 also connects to the input and output devices 730 and 735. The input devices enable the user to communicate information and select commands to the computer system. The input devices 730 include, but are not limited to, alphanumeric keypads (including physical keyboards and touchscreen keyboards) and pointing devices (also called "cursor control devices"). The input devices 730 also include audio input devices (e.g., microphones, MIDI musical instruments, etc.). The output devices 735 display images generated by the computer system. The output devices include, but are not limited to, printers and display devices, such as cathode ray tubes (CRT) or liquid crystal displays (LCD).

Finally, as shown in FIG. 7, bus 705 also couples computer 700 to a network 765 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 700 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

APPENDIX A

```
g367CB268B1094004A3689751E7AC568F.Modules.Bounce = function (media) {
    var Module = {
        Store: function (name, value) {
            if (Module.SupportsSessionStorage( )) {
                sessionStorage[name] = value; return; }
            var cookieValue = escape(value);
            document.cookie = name + "=" + cookieValue;
        },
        SupportsSessionStorage: function ( ) {
            try { return 'sessionStorage' in window && window['sessionStorage'] !== null;
            } catch (e) { return false; }
        },
        SupportsHistoryState: function ( ) { return (window.history && history.pushState); },
        Retrieve: function (name) {
            if (Module.SupportsSessionStorage( ))
                return sessionStorage[name];
            var i, cName, value, cookieArray = document.cookie.split(";");
            for (i = 0; i < cookieArray.length; i++) {
                cName = cookieArray[i].substr(0, cookieArray[i].indexOf("="));
                value = cookieArray[i].substr(cookieArray[i].indexOf("=") + 1);
                cName = cName.replace(/^\s+|\s+$/g, "");
                if (cName == name) { return unescape(value); }
            }
        },
        FireBounce: function ($) {
            Module.adShown = true;
            var html = document.getElementsByTagName("html")[0];
            var body = document.getElementsByTagName("body")[0];
            $("html").attr("style", "margin:0; padding:0; height:100%; width:100%;");
            $("body").attr("style", "margin:0; padding:0; height:100%; width:100%;overflow:hidden;");
            $("head").empty( );
            $("body").empty( );
            var div = document.createElement("div");
            var iframe = document.createElement("iframe");
            $(div).attr("style", "z-index: 99999; width: 100%; height: 100%; position: absolute;");
            $(iframe).attr("style", "margin:0; padding:0; height:100%; width:100%;");
```

APPENDIX A-continued

```
        div.id = "ExitOfferLayer";
        iframe.id = "ExitOfferIframe";
        iframe.setAttribute("frameBorder", "0");
        iframe.src = g367CB268B1094004A3689751E7AC568F.FetchMediaUrl(media);
        div.appendChild(iframe);
        $("body").append($(div));
      },
      Media: media,
      Init: function ( ) {
        var startHash;
        var initialPage;
        g367CB268B1094004A3689751E7AC568F.Script.Add("
https://ajax.googleapis.com/ajax/libs/jquery/1.8.1/jquery.min.js");
        g367CB268B1094004A3689751E7AC568F.Script.Load(function ( ) {
          g367CB268B1094004A3689751E7AC568F.Script.Add(g367CB268B1094004A36897
51E7AC568F.CDNHost + "/Scripts/Libs/jquery.ba-bbq.min.js");
          g367CB268B1094004A3689751E7AC568F.Script.Load(function ( ) {
            var jq164 = jQuery.noConflict(true);
            (function ($) {
              $(document).ready(function ( ) {
                if (Module.SupportsHistoryState( )) {
                  setTimeout(function( ) {
                    $(window).on('popstate', function(e) {
                      if (Module.pageCount < 1) {
                        if (!Module.adShown)
                          Module.FireBounce($);
                        else { location.reload( ); }
                      } }); }, 300); }
                else {
                  $(window).bind('hashchange', function (e) {
                    var fragment = $.param.fragment( );
                    var refererHost = document.referrer.split('/')[2];
                    if (Module.pageCount < 1) {
                      if (fragment != "!")
                        Module.FireBounce($);
                      else if (Module.adShown && fragment == "!")
                        location.reload( );
                    } }); } });
                Module.pageCount = Module.Retrieve("InfpageCount");
                Module.adShown = false;
                if (Module.pageCount == '' || Module.pageCount == undefined)
                  Module.pageCount = -1;
                Module.pageCount++;
                Module.Store("InfpageCount", Module.pageCount);
                startHash = $.param.fragment( );
                if (Module.pageCount == 0) {
                  if (Module.SupportsHistoryState( )) {
                    window.history.ready = true;
                    history.pushState(true, "Brought to you by Adsupply", window.location);
                  } else window.location.hash = '#' + "!";
            } })(jq164); }); }); }}; Module.Init( ); };
```

I claim:

1. A method for changing back button operation of a browser when navigating away from a landing site, the method comprising:

receiving the landing site at a user machine in response to a request from the user machine, the request comprising a first Uniform Resource Locator (URL) at which the landing site is accessed;

loading the landing site within the browser of the user machine, wherein loading the landing site comprises generating a first entry for the landing site in the browser, and wherein the landing site comprises a plurality of primary resources with a particular primary resource corresponding to embedded code;

executing the embedded code automatically in response to the user machine loading the landing site and before receiving user input on the user machine, wherein executing the embedded code comprises (i) generating a different second entry for the landing site in the browser by automatically navigating the browser from the first URL of the first entry to a modified second URL of the second entry that appends a hash mark with a fragment identifier to the first URL, and (ii) replacing at least one of the plurality of primary resources of the landing site with a new subresource that is added by the fragment identifier, wherein the new subresource does not modify a visual appearance of the landing site;

continuing execution of the embedded code in response to retaining the particular primary resource after navigating the browser from the first URL of the first entry to the modified second URL of the second entry, and modifying the plurality of primary resources;

detecting invocation of the browser back button via continued execution of the embedded code with the browser at the modified second URL; and presenting an advertisement, in place of or in addition to (i) the landing site and (ii) another website with an entry in the browser immediately before the first entry, in response to the embedded code continuing execution and detecting that the invocation of the browser back button transitions the browser from the second entry for the landing site to the first entry for the landing site.

2. The method of claim 1, wherein the modified second URL is different from the first URL by at least one alphanumeric character or symbol.

3. The method of claim 1, wherein said presenting comprises switching from the second entry to the first entry in response to said invocation of the browser back button.

4. The method of claim 3 further comprising switching from the first entry to the entry in the browser immediately before the first entry in response to a second invocation of the browser back button.

5. The method of claim 4 further comprising changing a display of the browser from the advertisement to the website with the entry immediately before the first entry in response to said switching from the first entry.

6. The method of claim 1, wherein said automatically navigating comprises creating the second entry within milliseconds of creating the first entry in the browser as a result of executing the embedded code.

7. The method of claim 1, wherein the new subsresource modifies the landing site with an invisible or imperceptible modification.

8. The method of claim 7 further comprising displaying the landing site after introducing or changing the new subresource as a result of executing the embedded code and navigating to the modified second URL.

9. A computer-implemented method for adapting browser behavior for presentation of an advertisement when navigating away from a landing page, the computer-implemented method comprising:
  incrementing an access count for a first Uniform Resource Locator (URL) each time the landing page is accessed at the first URL during a particular browsing session with a browser application, wherein the access count for the first URL corresponds to a number of times the first URL appears in a browser history of the browser application during the particular browsing session;
  identifying a second Uniform Resource Locator (URL) of a current page presented by the browser application;
  detecting invocation of back button functionality with the browser application at the second URL;
  determining that a URL preceding the second URL in the browser history for the particular browsing session is the first URL;
  decrementing the access count for the first URL in response to detecting invocation of the back button functionality and the URL preceding the second URL being the first URL;
  presenting the landing page accessed at the first URL or a page visited immediately before the landing page during the particular browsing session in response to the access count, after said decrementing, having a value greater than 1; and
  presenting the advertisement, instead of or in addition to the landing page or the page visited immediately before the landing page during the particular browsing session, in response to the access count, after said decrementing, having a value of 1.

10. The computer-implemented method of claim 9 further comprising generating first and second entries for the landing page in the browser history in response to embedded code from the landing page automatically navigating the browser application from the first URL of the first entry to the second URL of the second entry upon loading the particular landing page in the browser application and before receiving user input to the browser application, wherein a visual appearance of the landing page appears unchanged during said navigating from the first URL to the different second URL.

11. The computer-implemented method of claim 9, wherein said presenting the advertisement comprises adding an iFrame to the landing page, embedding the advertisement in said iFrame, and displaying said iFrame in the browser application.

12. The computer-implemented method of claim 9, wherein the second URL comprises the first URL appended with a fragment identifier.

13. The computer-implemented method of claim 9 further comprising detecting a first visit to the landing page during the particular browsing session based on a domain name of the first URL differing from domain names of a set of logged URLs in the browser history.

14. A method for changing back button operation of a browser when navigating away from a landing site, the method comprising:
  retrieving the landing site using a first Uniform Resource Locator (URL);
  comparing the first URL to a set of URLs previously entered in a history of the browser;
  issuing a first pushState event in response to retrieving the landing site, wherein issuing the first pushState event comprises creating a first entry for the first URL in the history of the browser;
  issuing a second pushState in response to determining that the first URL is not within the set of URLs previously entered in the history of the browser prior to said retrieving of the landing site, wherein issuing the second pushState event comprises creating a second entry for a different second URL immediately after the first entry in the history of the browser as a result of said retrieving corresponding to a first access of the landing site by the browser, and wherein the second URL comprises the first URL with a particular modification;
  performing a popState event for the second entry in response to invocation of the browser back button; and
  presenting an advertisement, instead of or in addition to the landing site or a page visited immediately before the landing site, in response to performing the popState event with the browser at the second entry and the first entry preceding the second entry in the history of the browser.

15. The method of claim 14, wherein performing the popState event comprises specifying an advertising server from which to retrieve the advertisement and one or more parameters with which to select the advertisement from a plurality of advertisements.

16. The method of claim 14, wherein presenting the advertisement comprises generating an iFrame, popup window, or an element with said advertisement, and displaying the iFrame, popup window, or element in place of or over the landing site.

* * * * *